United States Patent
Takagi et al.

(10) Patent No.: US 7,436,890 B2
(45) Date of Patent: Oct. 14, 2008

(54) QUANTIZATION CONTROL SYSTEM FOR VIDEO CODING

(75) Inventors: Koichi Takagi, Saitama (JP); Sei Naitou, Saitama (JP); Masahiro Wada, Saitama (JP); Shuuichi Matsumoto, Saitama (JP); Gouichi Ishihara, Saitama (JP)

(73) Assignee: KDDI R&D Laboratories, Inc., Saitama (JP)

( * ) Notice: Subject to any disclaimer, the term of this patent is extended or adjusted under 35 U.S.C. 154(b) by 786 days.

(21) Appl. No.: 10/392,392

(22) Filed: Mar. 20, 2003

(65) Prior Publication Data

US 2004/0013196 A1 Jan. 22, 2004

(30) Foreign Application Priority Data

Jun. 5, 2002 (JP) .............................. 2002-164776
Jun. 13, 2002 (JP) .............................. 2002-173141

(51) Int. Cl.
*H04N 7/18* (2006.01)
(52) U.S. Cl. ............................. 375/240.04; 375/240.02
(58) Field of Classification Search ................................ 375/240.01–240.29
See application file for complete search history.

(56) References Cited

U.S. PATENT DOCUMENTS

| 6,167,087 | A | 12/2000 | Kato |
| 6,173,069 | B1 * | 1/2001 | Daly et al. ................... 382/118 |
| 7,003,037 | B1 * | 2/2006 | Bordes et al. ........... 375/240.16 |
| 7,027,655 | B2 * | 4/2006 | Keeney et al. .............. 382/239 |
| 2002/0024999 | A1 | 2/2002 | Yamaguchi et al. |

FOREIGN PATENT DOCUMENTS

| JP | 10-028267 A | 1/1998 |
| JP | 10-164581 A | 6/1998 |
| JP | 10-285589 A | 10/1998 |
| JP | 2002-051345 A | 2/2002 |

OTHER PUBLICATIONS

G. Ishihara et al.; "Picture Quality Improvement of HDTV Encoding Scheme for TV Broadcasting based on Advances Quantization Control", *ITE Technical Report*; vol. 26, No. 31; Mar. 20, 2002; p. 19.
Gouichi Ishihara, et al., "Low bit-rate HDTV Coding Scheme by Using Adaptive Bit Assignment Based on Visual Weighting Factor," IEICE General Conference vol. 2002, Mar. 7, 2002, D-11-7, p. 7.
Japanese Office Action dated Feb. 14, 2007, Application No. 2002-173141.

* cited by examiner

*Primary Examiner*—Andy S Rao
(74) *Attorney, Agent, or Firm*—Westerman, Hattori, Daniels & Adrian, LLP.

(57) ABSTRACT

The present invention provides a quantization control system for video coding, for optimizing bit allocation based on visual priority which expresses at high precision human visual characteristics for videos, thereby improving subjective image quality of the whole image even with a limited number of bits. An object is extracted from a picture of an input image (S1) and a gaze parameter V(j) for the extracted object is calculated (S2). Then, a texture attribute parameter t(k) of each macroblock included in the object is calculated (S3). The gaze parameter V(j) and texture attribute parameter t(k) are used to calculate a visual priority parameter w(k) for each macroblock. Based on this parameter w(k), a quantization parameter is determined.

10 Claims, 7 Drawing Sheets

QUANTIZATION CONTROL SYSTEM FOR VIDEO CODING

BACKGROUND OF THE INVENTION

1. Field of the Invention

The present invention relates to a quantization control system for video coding. Particularly, the present invention relates to a quantization control system for video coding, for calculating a visual priority parameter which expresses human visual characteristics for videos with high precision and calculating a quantization parameter based on the visual priority parameter, thereby improving subjective image quality over the whole image even in a limited-bit-rate image distribution service.

2. Description of the Related Art

In a coding verification model Test Model 5 [1] of MPEG-2, which is an international standard for video coding, as shown in FIG. 8, there is provided a virtual buffer inputting the number of generated bits for each macroblock (identified as k) and outputting the number of target coded bits, and excess or deficiency of the generated bits relative to the number of target coded bits is stored in the virtual buffer to be fed back for quantization control.

Here, a weight factor for each macroblock (16×16 pixels), that is, a visual sensitivity w(k) is calculated by the following equation (1), and a quantization parameter is calculated by the following equation (2) using the visual sensitivity w(k) and an occupancy d of the virtual buffer. When the number of target bits of a picture and the number of macroblocks in a picture are indicated by T and MBcnt, respectively, the number of target coded bits is indicated by T/MNcnt.

$$w(k) = \frac{2 \times \text{act}(k) + \text{avg\_act}}{\text{act}(k) + 2 \times \text{avg\_act}} \quad (1)$$

where it is given act(k)=min $\{a_x(k)\}$, $a_x(k)$: luminance distribution of a block, and avg_act: an averaged act(k) of a picture.

Quantization parameter=Occupancy $d$×Visual sensitivity $w(k)$     (2)

However, in the above-mentioned conventional technique, the visual sensitivity is determined based on only luminance distribution of macroblocks, as seen from the equation (1), which presents a problem that weighting on each macroblock does not always match human visual sensitivity to videos.

Further, since the smallest luminance distribution ack(k) among luminance distributions $a_x(k)$ of blocks each of 8×8 pixels which constitutes a macroblock is used to calculate a visual sensitivity w(k) of the macroblock, when there exist a single flat block in a fine region, the calculated visual sensitivity is significantly different between a macroblock in which the flat block is included and a macroblock which includes no flat block, which presents a problem that the visual sensitivity varies widely between fine regions of almost similar quality.

Furthermore, for the case where quantization control is performed using a thus calculated quantization parameter, even though little noise is seen in the macroblock of the single flat block, the macroblock is subjected to fine quantization and accordingly, a large number of bits are allocated to the macroblock, presenting a problem that optimum bit allocation is not carried out.

SUMMARY OF THE INVENTION

It is an object of the present invention to provide a quantization control system for video coding for calculating a visual priority parameter indicating at high precision human visual characteristics to videos and for optimizing bit allocation based on the visual priority parameter, thereby improving subjective image quality on the whole image even with a limited number of bits.

In order to solve the aforementioned problems, the present invention provides a quantization control system for video coding, comprising: visual priority parameter calculating means for making an analysis of an input picture to calculate a visual priority parameter for each macroblock; and quantization parameter calculating means for calculating a quantization parameter based on the visual priority parameter calculated by the visual priority parameter calculating means.

The visual priority parameter calculating means comprises: luminance distribution value determining means for determining a luminance distribution value for each block of the macroblock; texture attribute parameter calculating means for calculating a texture attribute parameter for each macroblock based on the luminance distribution value; and parameter calculating means for calculating a visual priority parameter for each macroblock based on the texture attribute parameter.

According to the present invention, an analysis is made for each picture to calculate a visual priority parameter for a macroblock, and the visual priority parameter for a macroblock is calculated considering a texture attribute parameter for a macroblock. Therefore, the present invention can realize quantization better adapted to human visual characteristics than quantization in the conventional way of calculating a visual sensitivity based on only luminance distribution of macroblocks, thereby improving subjective image quality on the whole image.

DETAILED DESCRIPTION OF THE PREFERRED EMBODIMENT

Figure 1:
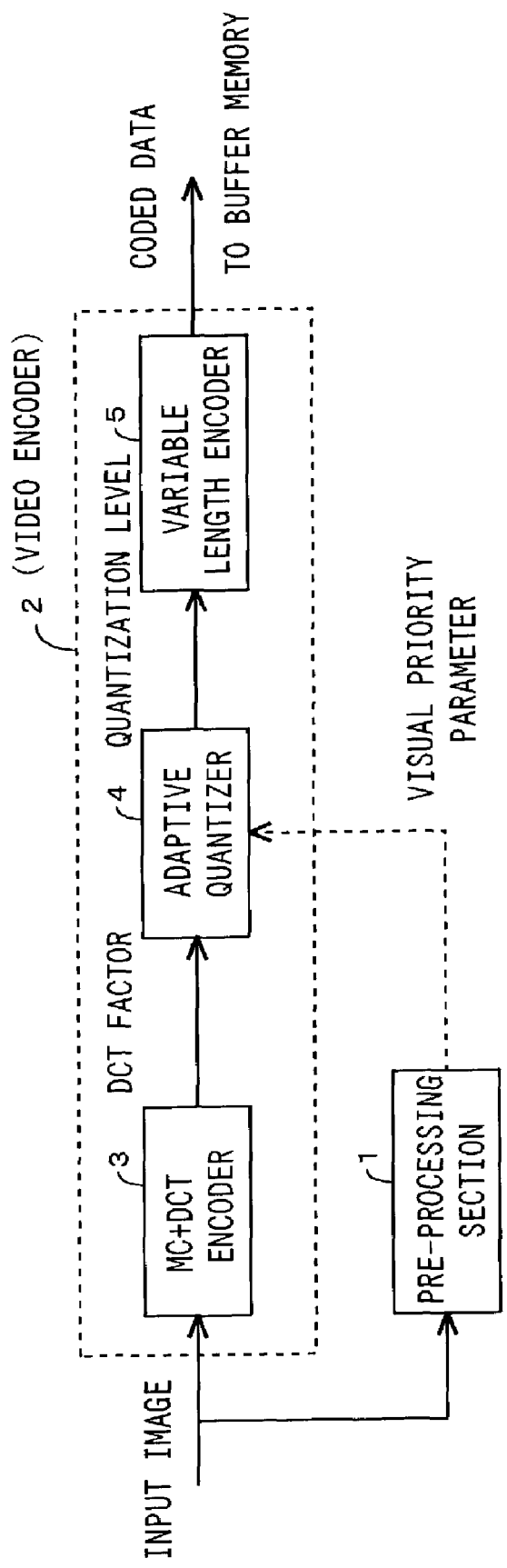
FIG. 1 is a conceptual view of a video coding apparatus to which a quantization control system of the present invention is applied.

Now, description regarding the present invention will be made in detail with reference to the drawings. FIG. 1 is a conceptual view of a video coding apparatus to which a quantization control system of the present invention is applied. In FIG. 1, the video coding apparatus comprises a pre-processing section 1 and a video encoder 2. An input image (video image or moving picture) is input to a motion compensation (MC) inter-frame prediction and DCT encoder 3, where an error is obtained by motion compensation inter-frame prediction and is transformed into a DCT factor. This DCT factor is substituted with a quantization level at an adaptive quantizer 4 and variable-length coded at a variable length encoder 5 to be coded data. The resultant data is multiplexed by motion vector information to be stored in a buffer memory.

The pre-processing section 1 estimates human visual sensitivity to the input image based thereon and calculates a visual priority parameter per macroblock of 16×16 pixels to output the visual priority parameter to the adaptive quantizer 4. The details of the pre-processing section 1 will be described later.

The adaptive quantizer 4 calculates a quantization parameter based on the visual priority parameter input from the pre-processing section 1 and determines bit allocation of the macroblock on a picture based on the quantization parameter.

Figure 2:
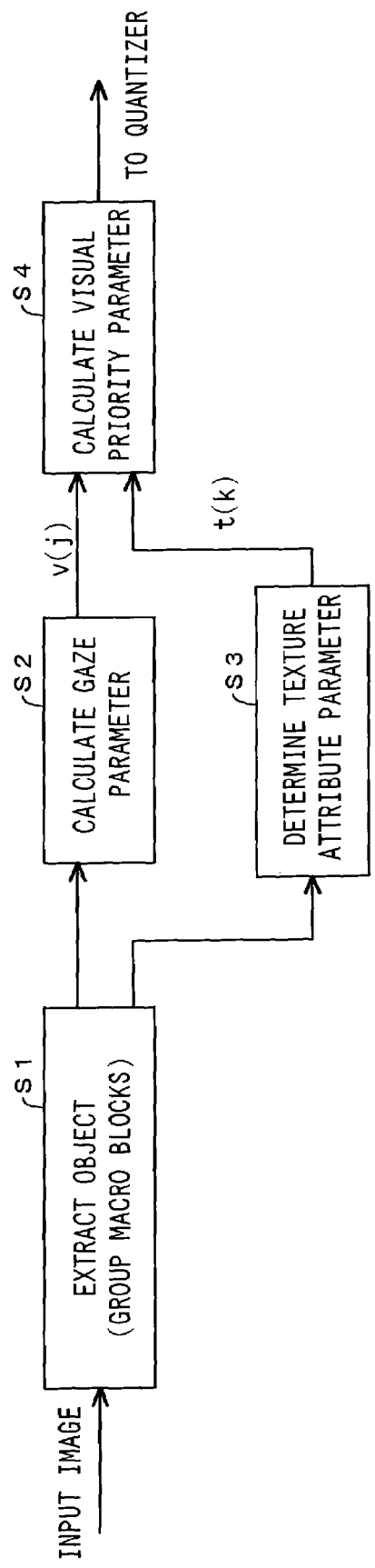
FIG. 2 is a flowchart of the processing performed at a pre-processing section in FIG. 1.

FIG. 2 is a flowchart of the processing performed at the pre-processing section 1 in FIG. 1. Each object existing in the picture is identified by j in the following description. Each macroblock is identified by k.

First, in step S1, an object is extracted from an input image on the basis of a picture. Extraction of the object can be performed by grouping (clustering) macroblocks based on their attributes. The attributes as clustering criteria can be defined by at least one index among a luminance element, a color element and a motion amount for respective macroblocks. With this processing, the macroblocks are divided into groups based on characteristic of the image on the display such as man, vehicle, background and so on. Hereinafter, macroblocks which constitutes one object, or grouped macroblocks, are collectively referred to as an MB group.

Figure 3:
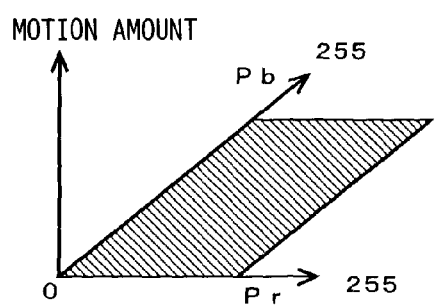
FIG. 3 is an explanatory view of clustering criteria for object extraction.

FIG. 3 illustrates a three-dimensional coordinate system consisting of a motion amount and two color elements Pb, Pr (0 to 255 levels) as clustering criteria of macroblocks, in which a motion amount and color elements Pb, Pr of each macroblock in one picture are found so as to plot the macroblock in the three-dimensional coordinate system, and adjacent macroblocks on the three-dimensional coordinate system are grouped into one group. For example, when the motion amount is divided into two levels and each of color elements Pb, Pr, into five, macroblocks can be grouped into 50 attributes at the maximum.

The color elements Pb, Pr can be obtained by averaging respective color elements Pb, Pr of the macroblocks. On the other hand, the motion amount of a macroblock can be obtained by finding a motion vector Vf(k) of the macroblock with reference to an immediately preceding frame in the order of playback, then performing global motion compensation to remove from the motion vector Vf(k) components due to camera operations such as panning, zooming and the like so as to find a compensated vector Vg(k) which shows only a motion particular to the object and determining an absolute value |Vg(k)| of the Vg(k).

In step S2, a gaze parameter V(j) of each object extracted in the step S1 is calculated. The gaze parameter V(j) of each object can be defined by at least one index among an averaged motion amount L(j) of macroblocks of the object, a scattering R(j) of macroblock motions in the object and a visibility K(j) of the object in a picture. The following description is made regarding an example of calculating a gaze parameter V(j) with the use of the three indices L(j), R(j) and K(j).

First, the averaged motion amount L(j) of macroblocks of the object is obtained by averaging in an MB group absolute values |Vf(k)| of motion amounts Vf(k) before global compensation.

Then, the scattering R(j) of macroblock motions in the object is obtained by calculating scattering R(j, k) of Vg(k) of adjacent macroblocks (identified as k') included in the same MB group in accordance with the following equation (3) to average them in the MB group.

$$R(j,k) = \frac{(|Vg(k)| + |Vg(k')|)^2}{(Vgx(k) + Vgx(k'))^2 + (Vgy(k) + Vgy(k'))^2} \quad (3)$$

where Vgx and Vgy indicate x coordinate and y coordinate of Vg, respectively.

The visibility K(j) of the object in a picture is calculated from scarcity Ka(j) and heterogeneity Kb(j) of the object. As is the case with the clustering criteria of the macroblocks, the scarcity Ka(j) is classified into 50 based on the clustering criteria of the MB group obtained from the averaged motion amount and the averaged color elements in the MB group, and then, a histogram is obtained indicative of the frequency of their occurrence on the screen so as to define a smaller frequency as a larger value.

The heterogeneity Kb(j) can be obtained by finding a difference Kb(j, p) of the clustering criteria between each boundary point of the MB group (point is identified as p) and another MB group adjacent thereto and averaging differences Kb(j, p) of the all points in the MB group.

The visibility K(j) of the object in a picture can be calculated from the thus calculated scarcity Ka(j) and heterogeneity Kb(j) by using the following equations (4) and (5). In the equation (4), the function S is a sigmoid function introduced to smooth an output of the function as an argument.

For S(Ka(j))×S(Kb(j))>1, $$K(j)=S(Ka(j))\times S(Kb(j)) \quad (4)$$

For the other cases, $$K(j)=1 \quad (5)$$

The gaze parameter V(j) of each object can be obtained by using the following equation (6) with the three indices L(j), R(j) and K(j) calculated as above.

$$V(j)=S(K(j))/(S(L(j))\times S(R(j))) \quad (6)$$

Thus calculated gaze parameter V(j) becomes larger for an object that produces small motion, small scattering of motion and is prominent in a picture, which means that the calculated gaze parameter V(j) matches human eyesight for moving objects and gaze characteristics.

Returning to FIG. 2, in step S3, a texture attribute parameter is determined on the basis of a macroblock. A texture attribute parameter of each macroblock can be determined in consideration of luminance distribution of blocks of the macroblock.

Figure 4:
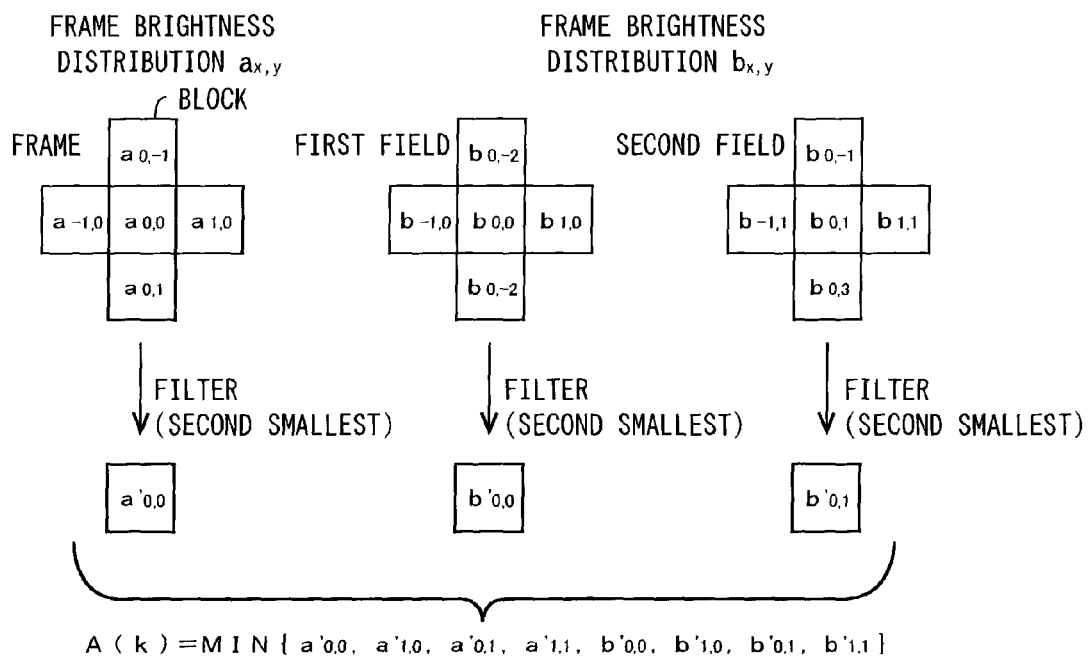
FIG. 4 is an explanatory view of a principle of determining texture attribute parameters.

FIG. 4 is an explanatory view of a principle of determining the texture attribute parameter. When the luminance distribution value of a block of 8×8 pixels, for example, existing in a macroblock (block is identified as m) is given by lv(m), a rank order filter is applied to a luminance distribution value of 5 blocks which consists of one block and adjacent 4 blocks which are vertically or horizontally aligned with the block, and the luminance distribution value other than minimal value, or the second smallest luminance distribution value, is extracted therefrom to be used as a compensated luminance distribution value clv(m). If the minimal value is extracted as the compensated luminance distribution value of each block, this value may correspond to a luminance distribution value of one separate flat block, and accordingly, a luminance distribution value other than minimal value, or the second smallest luminance distribution value, is preferably used.

In the blocks of the macroblock, the minimal value or an average of luminance distribution values extracted as above is defined as a compensated luminance distribution value A(k) of the macroblock.

Further, when video (moving picture) is played by interlaced scanning, as shown in FIG. 4, the filter is applied not only to a luminance distribution $a_{x,y}$ of the blocks of the frame but also to luminance distribution $b_{x,y}$ of first field blocks and second field blocks of the frame to extract the second smallest value $a'_{0,0}$ ... determine as the compensated luminance distribution A(k) of the macroblock the minimal value or an average among the all luminance distribution.

A texture attribute parameter t(k) can be obtained by the following equation (7) by applying the obtained compensated luminance distribution value A(k) to the sigmoid function S.

$$t(k)=S(A(k)) \quad (7)$$

Figure 5:
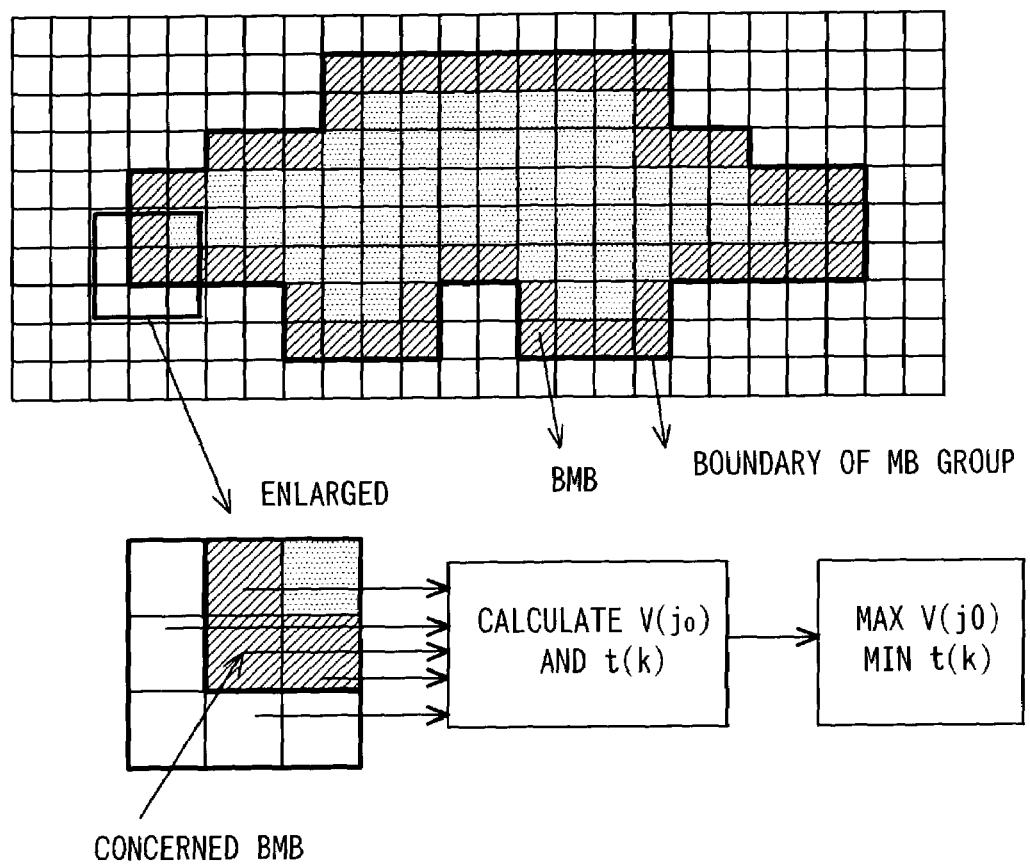
FIG. 5 is a view for explaining an operation for macroblocks on the boundary between macroblock groups.

There is often found a mixture of adjacent MB group attributes in macroblocks on the boundary between MB groups. Such macroblocks are likely to correspond to portions which undergoes significant change in color or edge portions on which men intend to fix the eyes. Therefore, in such a region, visual priority is heightened, which improves subjective image quality. Then, macroblocks BMB on the boundary between MB groups are subjected to compensation of texture attribute parameters, which is shown in FIG. 5.

First, a maximum $V_{max}$ of the object gaze values $V(j_0)$ of a macroblock BMB and four macroblocks which are vertically or horizontally aligned with the macroblock BMB, and a minimum $t_{min}$ of the texture attribute parameters t(k) of the macroblock BMB and the four macroblocks around the macroblock BMB are determined. These maximum and minimum are used to obtain a texture attribute parameter t(k) of the BMB from the following equation (8).

$$t(k)=(V(j_0)/V_{max}) \times t_{min} \quad (8)$$

Returning to FIG. 2, in the step S4, a visual priority parameter w(k) is calculated by the following equation (9) using V(j) and t(k) obtained from the equations (6), (7) and (8).

$$w(k)=t(k)/V(j) \quad (9)$$

This visual priority parameter w(k) is output to the adaptive quantizer 4 (in FIG. 1). The adaptive quantizer 4 determines a quantization parameter based on the visual priority parameter w(k) to perform quantization.

Figure 6:
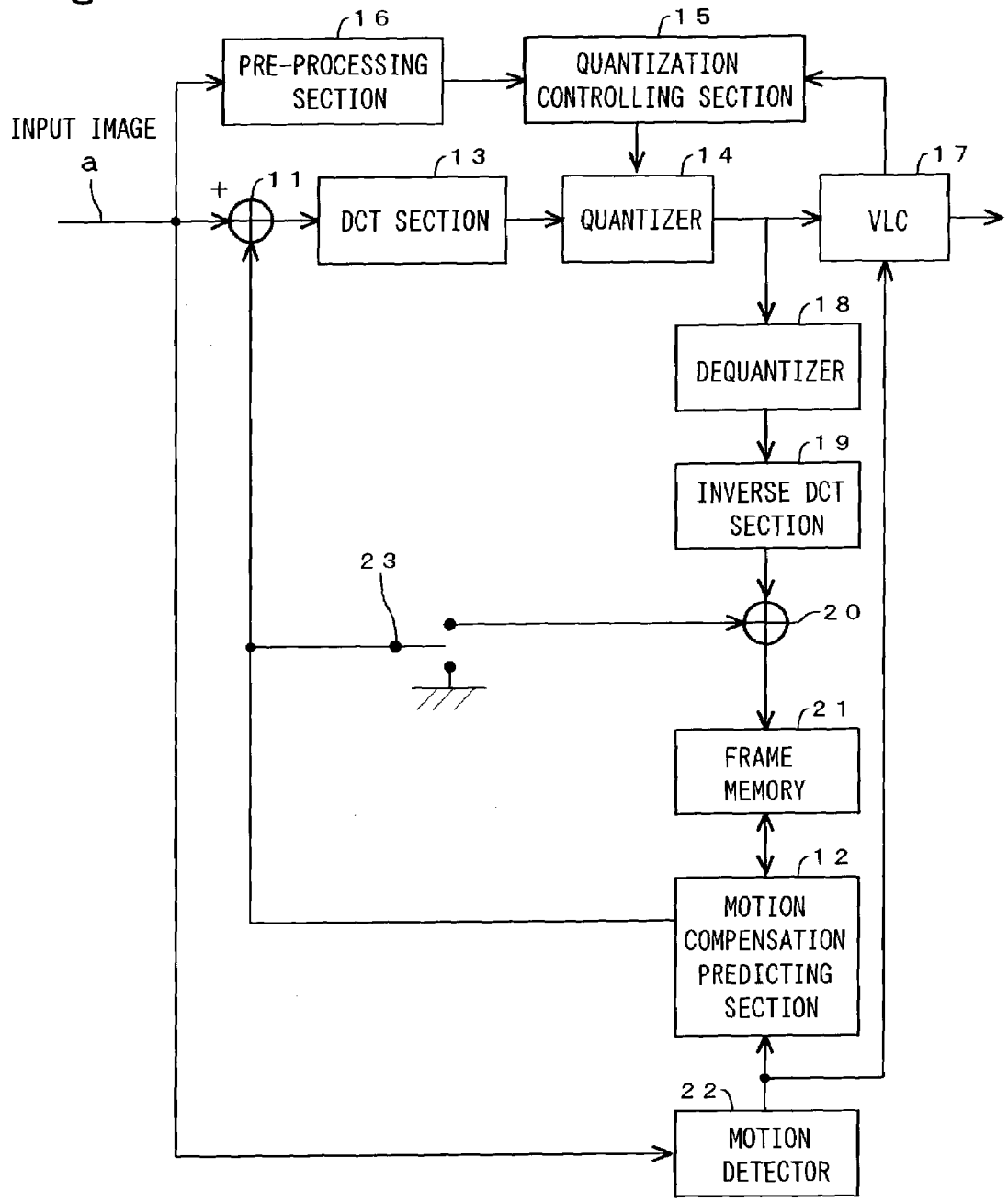
FIG. 6 is a block diagram showing in detail a video coding apparatus to which a quantization control system of the present invention is applied.

FIG. 6 is a block diagram showing in detail a video coding apparatus to which a quantization control system of the present invention is applied. A pre-processing section 16' in FIG. 6 corresponds to a portion that performs processing of the steps S1 and S2 in FIG. 2, while a quantization controller 15 corresponds to a portion that determines a quantization parameter of the steps S3 and S4 in FIG. 2 and the adaptive quantizer 4.

In FIG. 6, a subtracter 11 subtracts from an input image a, a prediction image obtained at the motion compensation predicting section 12 to generate a prediction error signal. This prediction error signal is transformed to a DCT factor at a DCT (orthogonal transformation) section 13 on the basis of a block of 8×8 pixels, for example.

The pre-processing section 16' analyzes the input image on the basis of a picture and groups (clusters) macroblocks into a group per object to determine a gaze parameter per object. The quantization controller 15 determines a quantization parameter from the clustering result and the gaze parameter of each object both obtained at the pre-processing section 16' and a target error voltage set for the picture (screen).

A quantizer 14 quantizes the DCT factor in accordance with the quantization parameter from the quantization controller 15. An output of the quantizer 14 is subjected to variable length coding at a variable length coding (VLC) section 17 (5 in FIG. 1) and then, multiplexed with motion vector information to be temporarily stored in a buffer.

The output from the quantizer 14 is subjected to inverse quantization at dequantizer 18 and then transformed to a prediction error signal at an inverse DCT section 19 to be added to a predicted image from the motion compensation predicting section 12 at an adder 20. Decoded image obtained by adding is stored in a frame memory 21.

A motion detector 22 detects image motion based on sequentially input images and outputs motion vector information. This image motion is detected on the basis of a macroblock of 16×16 pixels. The motion compensation predicting section 12 generates a predicted image based on the decoded image stored in the frame memory 21 and the motion vector information from the motion detector 22, and outputs the resultant prediction image to the subtracter 11 and the adder 20. A switching section 23 is provided for preventing inter-frame prediction at an initial of video sequence and at scene change, where inter-frame prediction is usually performed.

Figure 7:
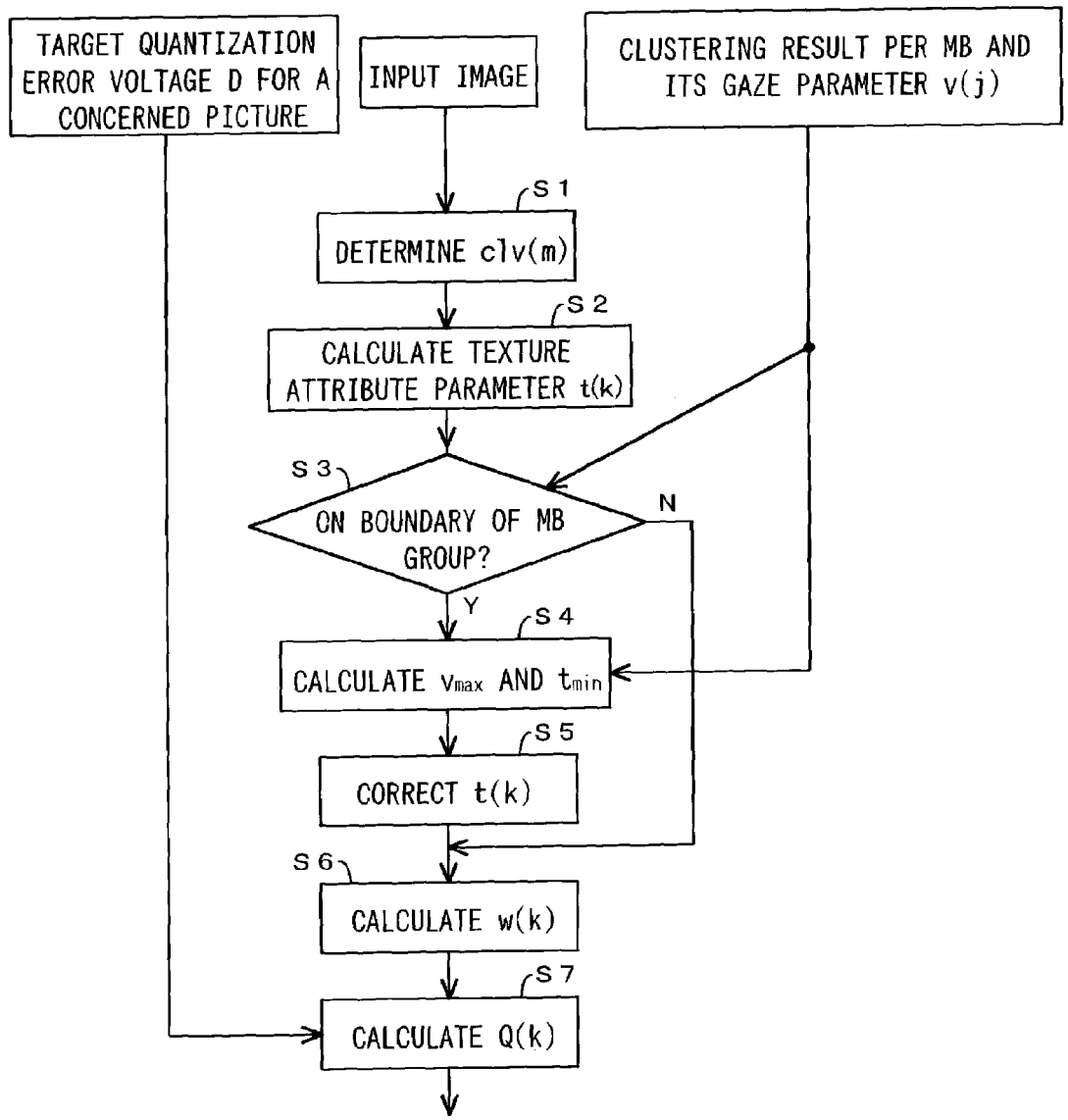
FIG. 7 is a flowchart of the processing performed at a quantization controller in FIG. 5.
Figure 8:
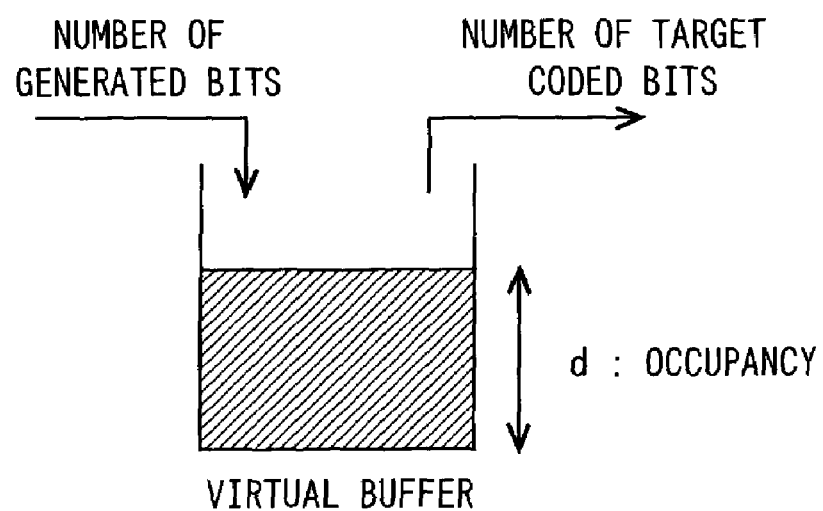
FIG. 8 is a conceptual view of an MPEG-2 coding verification model, Test Model 5[1].

FIG. 7 is a flowchart of the processing performed by a quantization controller 15 in FIG. 6. The quantization controller 15 receives: an input image; a clustering result into MB groups (each identified as j) each of which constitutes an object in one picture and a gaze parameter v(j) for each MB group; and a target quantization error voltage D set for the picture to calculate a quantization parameter Q(k) for each macroblock (identified as k) by inputting. The quantization parameter Q(k) is given to the quantizer 14 (in FIG. 6) so as to determine bit allocation on a macroblock layer.

Description is given below following the flow in FIG. 6. First, in the step S1, a luminance distribution value clv(m) of each of blocks (identified as m) of 8×8 pixels consisting in a macroblock is determined.

Then, in the step S2, a texture attribute parameter t(k) of the macroblock is determined based on the luminance distribution values clv(m) of the respective blocks. The texture attribute parameter t(k) can be obtained by the aforementioned equation (7).

In the step S3, it is determined by using the clustering result into the macroblock groups which correspond to respective objects in a picture whether macroblocks are positioned on the boundary between MB groups, and macroblocks on the boundary, that is, BMBs are subjected to the processing in the steps S4 and S5 as follows.

In step S4, a maximum $V_{max}$ of the gaze parameters $V(j_0)$ of a macroblock BMB and four adjacent macroblocks which are vertically or horizontally aligned with the macroblock, and a minimum $t_{min}$ of the texture attribute parameters t(k) of the macroblock BMB and the four macroblocks around the macroblock are calculated. These maximum $V_{max}$ and minimum $t_{min}$ are used in step S5 to correct texture attribute parameter t(k) of the BMB with the use of the above-mentioned equation (8).

In step S6, a visual priority parameter w(k) is calculated by the equation (9) using V(j) and t(k) obtained from the equations (6), (7) and (8). In step S7, the quantization parameter Q(k) per macroblock is calculated based on the visual priority parameter w(k) (Step S7).

The quantization parameter Q(k) can be obtained by the following equation (10) after setting an averaged quantization parameter $Q_{AVE}(i)$ for the picture so as to achieve the target quantization error voltage D of the picture set for each picture.

$$Q(k)=w(k)/Q_{AVE}(i) \quad (10)$$

Setting of a target quantization error voltage D on a picture layer is already described in the specification of the Japanese Patent Application No. 2001-370521 and therefore, detailed description thereof is omitted here. However, roughly speaking, setting of a target quantization error voltage D is performed based on a quantization error voltage for each picture calculated from the rate-distortion relational equation which is a function of allocated bits per picture and DCT counting distribution.

The thus calculated quantization parameter Q(k) is used to perform quantization and then, bit allocation. Accordingly, variation of the visual priority parameter w(k) is absorbed by settings of averaged quantization parameter $Q_{AVE}(i)$, thereby eliminating the necessity to normalize the visual priority parameter w(k).

As above, the embodiments of the present invention have been described. However, various modifications may be made to the present invention. For example, in extracting an object or grouping macroblocks, when an MB group clustered based on clustering criteria is small in size, MB groups which are vertically or horizontally adjacent around the MB group and also close in term of the clustering criteria are consolidated with the MB group to form a final MB group of size larger than a predetermined size, thereby reducing processing without deteriorating calculated visual priority.

Further, in calculating an averaged motion amount L(j) of macroblocks included in an object, a motion amount which is extremely different from another is withdrawn from calculation, thereby reducing affects of noise.

As described in detail above, according to the present invention, it is possible to analyze with high accuracy a configuration of an object and macroblocks in a picture prior to coding and then, to optimize bit allocation locally in a picture, at an encoder. Accordingly, though deterioration is found in a visually discreet region, coding performance is remarkably improved in a visually prominent region, thereby enhancing subjective image quality on the whole image. This further prevents deterioration of the image quality in narrow-band HDTV (high definition TV) broadcasting which is a problem in the conventional video coding.

Since quantization is often utilized in image transmission services using video coding, the present invention is broadly applicable to image transmission services. When the present invention is applied to image services dedicated for broadcasting stations, a promoted efficiency of CODEC for compression transmission can be expected and HDTV transmission with high image quality can be realized even at a low rate, thereby expanding a range of narrow-band image services such as SNG (satellite news gathering) and FPU (filed pick up).

Further, when the present invention is applied to broad band image providing services such as FTTH (fiber to the home), using of HDTV coding technique with low rate and high image quality can realize an IP-based HDTV distribution.

Furthermore, the present invention is applicable to a system as a whole which handles video compression coding such as HDTV/SDTV (standard definition TV) by MPEG-2 and Motion JPEG 2000 in order to realize high-quality image transmission system.

What is claimed is:

1. A quantization control system for video coding comprising:
    visual priority parameter calculating means for analyzing an input video per picture to calculate a visual priority parameter for each macroblock, the visual priority parameter indicating human visual sensitivity to the input image; and
    quantization parameter calculating means for receiving the visual priority parameter from the visual priority parameter calculating means and for calculating a quantization parameter based on the received visual priority parameter calculated by the visual priority parameter calculating means,
    wherein the visual priority parameter calculating means comprises an object extraction means for extracting an object from the picture the object being extracted by grouping macroblocks which have similar attributes, and a gaze value calculating means to calculate a gaze value for each object extracted from the picture,
    wherein the visual priority parameter calculating means calculates the visual priority parameter with a function whose variables are the gaze value for each object extracted from the picture and a texture attribute for each macroblock.

2. The quantization control system for video coding according to claim 1, wherein the grouping of macroblocks having a similar attribute to extract an object is performed based on a clustering criteria defined by at least one index among a luminance element, a color element and a motion element.

3. The quantization control system for video coding according to claim 1, wherein the gaze value for each object extracted from the picture is defined with the use of at least one index among an averaged motion amount of the macroblocks included in the object extracted from the picture, a scattering of motion of the macroblocks included in the object extracted from the picture and a visibility of the object within the picture.

4. The quantization control system for video coding according to claim 1, wherein the texture attribute for each macroblock is determined in consideration of luminance distribution values of the blocks of the macroblock.

5. The quantization control system for video coding according to claim 1, wherein the visual priority parameter calculating means comprises:
    luminance distribution value determining means for determining a luminance distribution values of blocks which constitute each macroblock per picture;
    texture attribute parameter calculating means for calculating a texture attribute parameter of each macroblock based on the luminance distribution values; and
    parameter calculating means for calculating a visual priority parameter of the macroblock based on the texture attribute parameter.

6. The quantization control system for video coding according to claim 5, wherein the texture attribute parameter calculating means calculates the texture attribute parameter of the macroblock by using a luminance distribution value other than the smallest luminance distribution value among the luminance distribution values of blocks which constitute the macroblock and an average of a luminance distribution value of the blocks which constitute the macroblock.

7. The quantization control system for video coding according to claim 6, wherein the luminance distribution value other than the smallest luminance distribution value is a second smallest luminance distribution value.

8. The quantization control system for video coding according to claim 5, wherein the texture attribute parameter calculating means corrects a texture attribute parameter of a macroblock on a boundary of the object in the picture by using a texture attribute parameter of an adjacent macroblock and the gaze value of the object.

9. The quantization control system for video coding according to claim 8, wherein the gaze value of the object extracted from the picture is defined with the use of at least one index among an averaged motion amount of the macroblocks included in the object extracted from the picture, a scattering of motion of the macroblocks included in the object extracted from the picture and a visibility of the object within the picture.

10. The quantization control system for video coding according to claim 3, wherein the gaze value is defined using the visibility of the object within the picture, and the visibility of the object within the picture is calculated from scarcity and heterogeneity of the object.

* * * * *